United States Patent [19]

Charny

[11] Patent Number: 6,130,878
[45] Date of Patent: *Oct. 10, 2000

[54] METHOD AND APPARATUS FOR RATE-BASED SCHEDULING USING A RELATIVE ERROR APPROACH

[75] Inventor: Anna Charny, Sudbury, Mass.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/579,393

[22] Filed: Dec. 27, 1995

[51] Int. Cl.$^7$ ............................................ H04J 3/02
[52] U.S. Cl. ........................ 370/230; 370/412; 370/235; 370/234; 370/232; 370/468; 370/395
[58] Field of Search ................................. 395/672, 673, 395/674, 280, 287, 290, 291, 292, 293, 297, 670, 671, 675, 676, 677; 370/395, 431, 442, 443, 458, 468, 412, 229–235; 713/400, 502, 600; 709/102–105

[56] References Cited

U.S. PATENT DOCUMENTS

| | | | |
|---|---|---|---|
| 4,807,116 | 2/1989 | Katzman et al. | 395/293 |
| 5,301,333 | 4/1994 | Lee | 395/725 |
| 5,367,678 | 11/1994 | Lee et al. | 395/674 |
| 5,392,280 | 2/1995 | Zheng | 370/60 |
| 5,434,860 | 7/1995 | Riddle | 370/232 |
| 5,506,969 | 4/1996 | Wall et al. | 395/287 |
| 5,528,513 | 6/1996 | Vaitzblit et al. | 370/232 |
| 5,533,009 | 7/1996 | Chen | 370/17 |
| 5,533,020 | 7/1996 | Byrn et al. | 370/60.1 |
| 5,555,244 | 9/1996 | Gupta et al. | 370/397 |
| 5,566,163 | 10/1996 | Petit | 370/17 |
| 5,577,035 | 11/1996 | Hayter et al. | 370/60 |
| 5,602,830 | 2/1997 | Fichou et al. | 370/232 |
| 5,619,502 | 4/1997 | Kahn et al. | 370/397 |

FOREIGN PATENT DOCUMENTS

| | | | |
|---|---|---|---|
| 0 669 777 A1 | 8/1995 | European Pat. Off. | H04Q 11/04 |
| 07221768 | 8/1995 | Japan | H04L 12/28 |
| 09130398 | 5/1997 | Japan | H04L 12/28 |

OTHER PUBLICATIONS

IEEE/ACM Transactions on Networking, vol. 3, No. 6, Dec. 1, 1995, pp. 683–689, XP000544172 Xie G G et al: "Delay Guarantee of Virtual Clock Server" *p. 683, col. 2, Line 33–Line 45* *p. 685, col. 2, Line 7 —Line 28* *p. 685, Line 1 —Line 31*.

Motorola/Codex, "Scheduler for Rate Based ABR", Dick Kline, Jul. 27, 1994, pp. 1–7.

IEEE, Hui Zhang, "Service Disciplines For Guaranteed Performance Service In Packet–Switching Networks", pp. 1–23.

Samokhvalenko, A.S., "Integration errors due to nonlinear frequency sweeping," Izvestiya Vysshikh Uchebnykh Zavedenii, Radioelektronika, vol. 18, No. 7, pp. 101–103 (English translation), Jul. 1975.

Hui, J.Y., "Network, transport, and switching integration for broadband communications," IEEE Network, vol 3, Issue 2, pp. 40–51, Mar. 1989.

Aggarwal, et al., "Efficient routing and scheduling algorithms for optical networks," Proc. of the 5th Ann. SIAM Symp. on Discrete Algs., pp. 412–423, Jan. 25, 1994.

Stallings, W., "Data and Computer Communications", 4th Ed., Prentice Hall Pub., pp. 203–211, 1994.

*Primary Examiner*—Kakali Chaki
*Attorney, Agent, or Firm*—Hamilton, Brook, Smith & Reynolds, P.C.

[57] ABSTRACT

This disclosure presents a novel scheme for rate-based scheduling. In particular, this approach can be applicable to scheduling flows in computer networks such as ATM. It can also be used to provide weighted fair service in scheduling computer jobs. Unlike many of the methods commonly used for rate scheduling in network adapters, the present method allows to provide strict rate guarantees to all flows. A distinguishing feature of the present method is that it operates in the frequency domain, rather than in time domain.

8 Claims, 3 Drawing Sheets

METHOD AND APPARATUS FOR RATE-BASED SCHEDULING USING A RELATIVE ERROR APPROACH

CROSS REFERENCES TO RELATED APPLICATIONS

The present invention is related to patent application Ser. No. 08/578,932 entitled Method and Apparatus for Hierarchial Relative Error Scheduling by Anna Charny, filed on Dec. 27, 1995, noe U.S. Pat. No. 5,781,531.

FIELD OF THE INVENTION

The present invention relates to a method and apparatus of rate-based scheduling and weighted fair sharing of a common resource. The problem of rate-based scheduling and weighted fair sharing arise in many different contexts and relate, for example, to the field of computer networks or to processor design. In general, the present invention relates to any problem of scheduling jobs according to some rates in a broad context of environments and applications.

BACKGROUND OF THE INVENTION

The problem of scheduling different jobs sharing a common resource occurs in many different contexts. In the most general terms it can be formulated as follows:

A single resource of some kind is shared by several entities indexed by integers i=1,2, . . . n. Every entity has a rate R(i) associated with it. The rates are assigned in such a way that sum of all R(i) does not exceed the capacity of the resource. For example, in computer networks the entity is an individual flow, and the shared resource may be a bottleneck communications link or a server capacity. The entities can be served in some service increments, one at a time. For example, the service increment for a network flow is one packet (or cell, in the ATM terminology). A device, called the Scheduler, needs to determine the order of service for different entities so that average service rate received by an entity is its assigned rate R(i). Aside from guaranteeing the long-term average rate, an important goal is to bound the discrepancy between the ideal and the actual service times of each individual service increment, i.e., each packet of each flow.

An example of an environment where such problem occurs is a processor which must schedule jobs competing for its cycles. If all jobs are of equal importance, then it is desirable to provide all jobs an equal share of the processor capacity. If, however, the jobs have different importance, a possible strategy is to assign weights to all jobs corresponding to their importance, and provide each job a share of processor capacity proportional to the weight assigned to the jobs. In this case the desired service rates are determined by the weights of the flows. An alternative approach might be to assign rates to flows according to some other rule, which is specific to a particular policy and environment of the problem. For example, a rule might be to give some fixed allocation to high priority jobs and then share the remaining bandwidth among low priority jobs.

As mentioned earlier, another example when a similar problem might occur is in computer networks. For example, in ATM networks there is usually some rate associated with every flow traversing the network. This rate can be either the result of negotiation with the network at setup time, as for example for Constant Bit Rate (CBR) traffic, or can be the result of a traffic management feedback control scheme as is the case for Available Bit Rate (ABR) traffic. The set of rates can be either relatively static, as for long-term CBR flows, or may change quickly in response to congestion as in the case of ABR flows.

Even if the rates are not assigned explicitly, which is the case, for example, in many packet-switching networks, different flows may be of different importance. For example, one flow may be a compound flow of data from 1000 users, while another flow may represent a single user. It may be reasonable in such case to assign weights to different flows given their relative importance. If the total demand of flows exceeds the capacity of the bottleneck resource, typically a communication link, then a possible policy is to service the congested switch to all flows proportionally to their weights just as described earlier in the example of processor sharing. This effectively assigns rates to the flows.

In recent years, rate-based scheduling disciplines at the switching points in computer networks have received a lot of attention. A comprehensive review of such schemes can be found in Hui Zhang, Service Disciplines for Guaranteed Performance in Packet-Switching Networks, Proceedings IEEE, October 1995. These schemes generally are applicable at network switches and can guarantee rates assigned to the flows.

The problem of scheduling of different flows in computer networks exists not only for the switches in the network, but in host adapters as well. For example, an adapter in an ATM network must schedule different flows each having a rate associated with it. Typically, the CBR flows are serviced at a higher priority according to a pre-computed schedule. One of the disadvantages of pre-computing the CBR schedule is that because it is computed without taking any non-CBR flows into account, the service of non-CBR flows may be unnecessarily adversely affected by the CBR bursts. Pre-computing the schedule also has the disadvantage that it is computationally expensive and is usually done in software on a slow time scale. While this may be acceptable for CBR flows which only need to perform this once a new connection is established, it is not feasible if many flows with frequently changing rates need to be scheduled.

Another scheme that is known for rate-based scheduling is the so-called Leaky Bucket, described for example in The ATM Forum Traffic Management Specification Version 4.0. The scheme requires a large amount of per flow state and therefore is prohibitive for a large number of flows.

Also frequently used is the so called "time-wheel" or "calendar queue" approach. An example of the calendar queue approach may be found in Brown., R, Calendar Queue: A fast O(1) priority queue implementation for the simulation even set problem, Communications of the ACM, vol.31, pp.1220–1227. Unlike the Leaky Bucket scheme, the calendar queues are simple to implement. Unfortunately, in general the calendar queue approach cannot guarantee that the long-term average rate achieved by the flow is equal to its assigned rate.

Therefore, it is desirable to design a scheme that can be used for rate-based scheduling of flows with dynamically changing rates at networks adapters and can guarantee the assigned rate of the flow.

It is also desirable that this scheme can be used for CBR-type traffic (also known as guaranteed service in packet switching networks) and ABR-type traffic (also known as adaptive traffic) simultaneously, as well as VBR traffic (variable bit rate) in ATM networks (also known as predictive traffic in packet switching networks). Finally it is desirable that this scheme can be used in a more general context of rate-based scheduling as described earlier.

The approaches described in the paper by Hui Zhang for switch scheduling are not easily applicable to the adapters. One of the reasons for that is that most of the scheduling schemes for the switches rely on packet arrival times to the switch to determine the scheduling order of packets from different flows. The notion of arrival time is not always well-specified for the adapter, since typically the adapter requests data from the application when it is ready to transmit its data.

What is needed is a general approach to rate scheduling that will work in many different environments. In particular, the new approach should work well for network adapters as well as for network switches.

SUMMARY OF THE INVENTION

The new scheme described in this application, referred to as Relative Error (RE) Scheme can be used in particular for network adapters as well as for network switches to provide stringent rate guarantees. However, as mentioned earlier, its use is not limited to the field of computer networks. Unlike most of the schemes described above, which operate in the time domain, the RE scheme operates in the frequency domain. One of the advantages of it is that the necessity of rate-to-time conversion (which involves findings an inverse of a rate) is eliminated.

A method of scheduling a plurality of data flows in a shared resource in a computer system, each of the data flows containing a plurality of data cells, is provided including the steps of providing a scheduler in the shared resource, the scheduler having a plurality of link cell slots, initializing the scheduler to receive the plurality of data flows, receiving each of the plurality of a data flows in the scheduler, each of data flows containing a requested flow rate, scheduling, by the scheduler, each of the plurality of data flows such that a sum of each of the requested flow rates of each of the plurality of data flows is less than an available bandwidth in the shared resource and a relative error is minimized between an actual scheduling time and an ideal scheduling time on a per cell basis, and repeating the steps of receiving and scheduling.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments, which follow, when read in conjunction with accompanying drawings, wherein:

DESCRIPTION OF THE PREFERRED EMBODIMENT(S)

Figure 1:
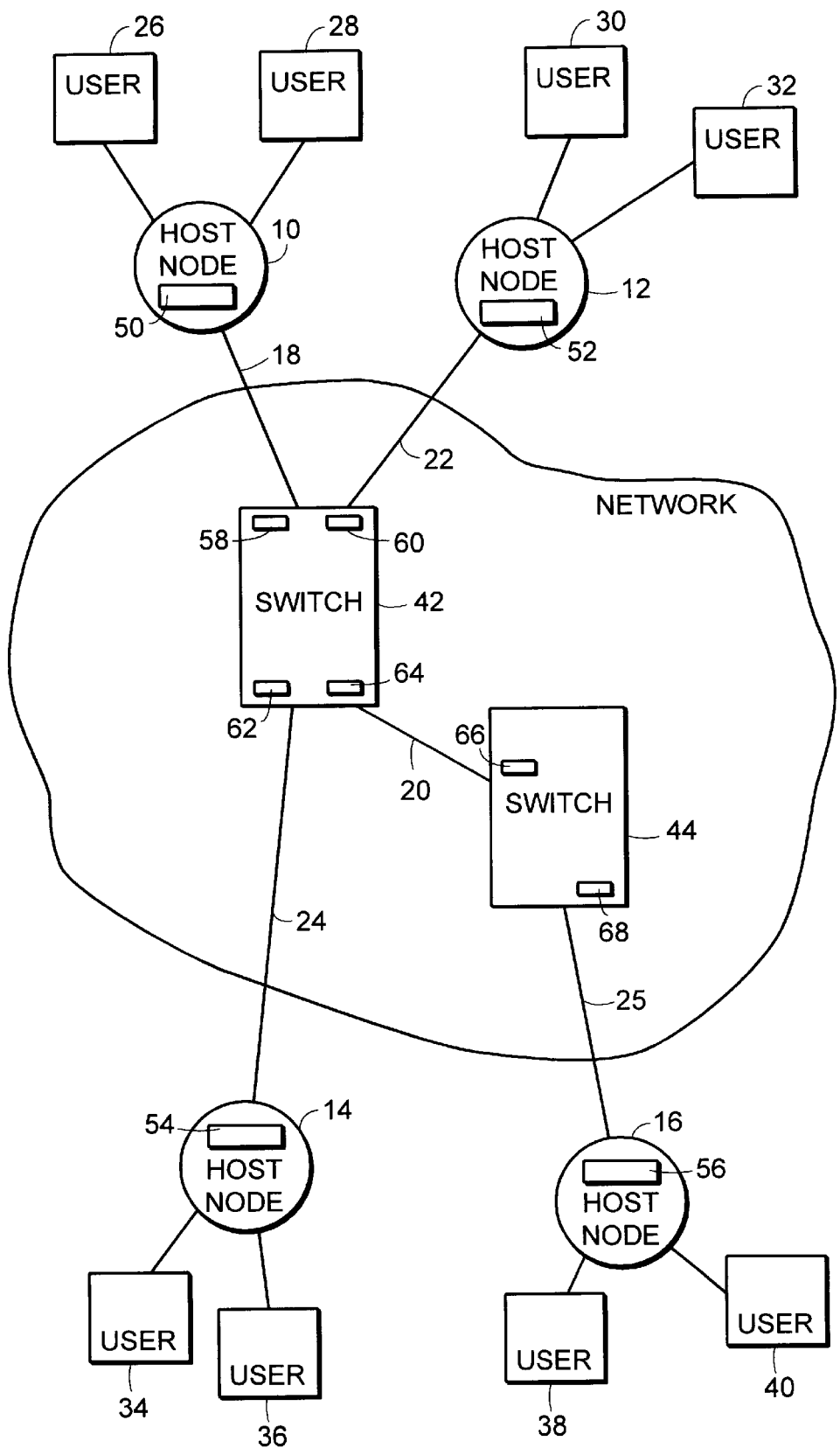
FIG. 1 is a block diagram of an exemplary computer network in which the present invention may be used.

A preferred embodiment of the present invention will be described in the context of a computer network. Referring to FIG. 1, an exemplary network is shown to include four host nodes labeled as 10, 12, 14, and 16. Each of the host nodes is also shown to be shared by a number of users. Specifically, host node 10 has users labeled as 26 and 28, host node 12 has users labeled as 30 and 32, host node 14 has users labeled as 34 and 36, and host node 16 has users labeled as 38 and 40.

The exemplary network shown if FIG. 1 also includes two switches labeled as 42 and 44, respectively. Users communicate through the network with each other. For example, user 26 at host node 10 communicates with user 36 at host node 14, user 28 at host node 10 communicates with user 38 at host node 16, and user 30, user 32 at host node 12 communicate with user 38 and user 40 at host node 16, respectively.

The host nodes are shown connected to the switches, and the switches are shown connected to each other, by way of communication links. For example, link 18 connects host node 10 to switch 42, and switches 42 and 44 are connected by a link 20. Link 22 connects host node 12 to switch 42, link 24 connects switch 42 to host node 14, and link 25 connects switch 44 to host node 16. For convenience, we shall associate the flow of data from a source to a destination with the source of this flow. For example, we shall refer to flow from user 26 to user 36 as "flow of user 26."

Each of the host nodes 10, 12, 14, and 16 are shown to include a scheduler. Specifically, host node 10 has a scheduler 50, host node 12 has a scheduler 52, host node 14 has a scheduler 54, and host node 16 has a scheduler 56. Typically, the scheduler resides in a host adapter card (not shown).

Each of the switches 42 and 44 is also shown as having a scheduler associated with each link connected to the switch. For example, switch 42 contains a scheduler 58 associated with link 18. Scheduler 60 is associated with link 22, scheduler 62 is associated with link 24, and scheduler 64 is associated with link 20. Switch 44 contains a scheduler 66 associated with link 20, while scheduler 68 is associated with link 25.

Each of the schedulers shown in FIG. 1 is responsible for scheduling different flows which share common resources within the exemplary network. By way of example, we shall assume that a limiting factor (or "bottleneck") resource is a link's capacity. For example, assume that all links in the network are of capacity 155 Mbs except link 20, which has capacity of 50 Mbs. Therefore, user 28, user 30, and user 32 share a common bottlenecked link, i.e., link 20. To insure fairness, each of these users can therefore transmit data at one third of the capacity of link 20, i.e., at approximately rates R(2)=R(3)=R(4)=16.67 Mbs. User 26 can therefore transmit data at the full remaining bandwidth of link 18, i.e., at R(1)=138.33 Mbs. However, any other transmission rate assignment is possible, as long as the sum of rates of user 26 and user 28 does not exceed 155 Mbs, which is the capacity of link 18, and the sum of the rates of user 28, user 30, and user 32 does not exceed 50 Mbs, which is the capacity of link 20. The average service rate that the scheduler provides to each user must be equal to the rate assigned to these users. Thus, the scheduler 50 is responsible for scheduling flows submitted to host node 10 by user 26 and user 28 at rates R(1) and R(2) respectively.

The present invention may reside in any of the schedulers shown in FIG. 1 and relates to a method and apparatus of rate-based scheduling and weighted fair sharing of a common resource.

By way of example, an exemplary embodiment of the present invention will be described in the context of flows in the exemplary network of FIG. 1. However, the present invention is adapted to any computer application that requires a weighted fair rate service in scheduling computer jobs. The exemplary embodiment will use an Asynchronous Transfer Mode (ATM) network as an example. ATM networks use fixed length data packets generally referred to as ATM cells. However, as mentioned above, the present invention may be generalized to variable length data packets.

Using an ATM network as a specific example, the present invention may reside in an adapter (not shown), the adapter having a scheduler (i.e., 50, 52, 54, and 56) contained in each of the host nodes 10, 12, 14, and 16, and/or in the schedulers 58, 60, 66, 62, 64, and 68 of switches 42 and 44.

As is described below, the main idea of the present invention is to use a Relative Error (RE) approach to minimize the discrepancy between the actual scheduling time and the "ideal" scheduling time on a per cell basis through any switch or adapter in the ATM network.

In the context described, the problem of scheduling of flows through and by any switch or adapter may be formulated as follows.

Given:

n flows indexed by integers 1,2, . . . n sharing a slotted link (any switch or adapter) of capacity C each flow i is assigned a rate R(i), so that $$\sum_i R(i) \le C.$$

We assume for this embodiment that all packets are of the same size, as for example, in an Asynchronous Transfer Mode (ATM) network. We shall use the ATM term cell to denote a fixed size packet. The time of transmission of one cell at link speed will be referred to as "cell time" or "cell slot," interchangeably.

At the beginning of j-th link cell-slot the scheduler needs to determine the cell of which flow (if any) must be scheduled for transmission. The goal is to ensure that the long-term average rate of flow i is guaranteed to be R(i), with bounded discrepancy between actual and ideal transmission times of each cell.

Note also that in the context of processor job scheduling (in contrast with the flow scheduling in a network), the rates R(i) typically reflect the weights of the jobs, C is the processor capacity available for these jobs, and the inequality above is typically an equality, and the service increment is usually some number of processor cycles dedicated to a job.

To fully illustrate the present invention, hereinafter referred to as the RE scheme or the RE scheduler, the following variables are used:

D(i,j) error term for flow i at link cell slot j

R(i) rate of flow i (i=0 corresponds to the "virtual flow" (fully described below), whose rate is simply the difference between the available bandwidth C and the sum of rates of all real flows i=1,2, . . . n.

w(i) rate of flow i relative to the total available bandwidth C Note: R(i) are required for initialization and rate changes only, and do not need to be stored in per flow state. Variables w(i) and D(i,j) are stored per flow.

The flow indexed by zero is the so-called "virtual flow". Its rate is simply the link bandwidth unused by all "real" flows. In this disclosure we will refer to flow 0 as a regular flow, and by sending a cell of flow zero we shall mean that an idle cell was sent (no cells of "real" flows transmitted). Initialization of the procedure RE_Scheduler occurs in the following manner:

```
j=0;
R(0)=C - Σ R(i)
       i>0
for all i
{
    w(i)=R(i)/C;
    D(i,0)=0;
}
```

The RE scheduler operates as described in the following pseudocode.

```
RE_Scheduler:
do forever
{
    find flow f with D(f,j)=max_{i}D(i,j)
    if ((f>0) AND (cell of flow f available))
        transmit next cell from flow f
    else do not transmit (transmit an idle cell)
    j=j+1;
    D(f, j) = D(f,j)+w(f) - 1;
    for all i ≠ f
        D(i,j)=D(i,j)+w(i);
}
```

The following procedure updates the appropriate variables upon a change of the rate of some flow. It is assumed that the set of rates remains feasible after the rate change, i.e. the sum of all rates does not exceed the link bandwidth C.

```
Rate_Change:
if rate of flow i>0 changed to Rnew(i)
    wold(i) = w(i);
    w(i) = Rnew(i)/C;
    Dold(i,j) = D(i,j);
    D(i, j) = w(i) - 1
    w(0)= wold(0) + wold(i) - w(i)
    D(0,j) = D(0,j) + Dold(i,j) - D(i,j);
```

Note that the procedure Rate_Change can also be used if a new flow enters or an old flow exits by assigning w(i)=0, to any inactive flow. Note also that it is assumed that any change of rate does not violate the requirement that the sum of all rates of all "real" flows does not exceed the link capacity. Similarly, when a new flow enters with some rate, the sum of all rates still does not exceed the link capacity. If the rates of several flows change simultaneously, the procedure Rate_Change is executed for all flows one at a time.

The RE scheduler described above exhibits several properties. The first property, referred to as Property 1, follows:

let B(i,m) denote the "ideal" beginning time of transmission of m-th cell of flow i in isolation. Assuming the zero-th cell transmission starts at time zero, the m-th cell transmission then starts exactly at time mT(i), where T(i)=cell_len/R(i)). Here cell_len is the length of one cell (in bits), and R(i) is the assigned rate of flow I in some units of time, e.g., seconds. Denote A(i,m) the beginning of actual transmission time of the m-th cell of flow i under the scheduler RE. Then for any m $$-T(i)+\text{cell\_time} \le A(i,m)-B(i,m) \le (n/2+1)T(i)$$

where n is the number of supported flows, T(i)=cell_len/R(i) is the interval between cell transmissions at rate R(i), cell_time=cell_len/C is the cell transmission time at link speed. If k scheduling opportunities were missed by flow i because data was not available at the time the flow was scheduled, when the m-th cell finally becomes available, then the starting time of transmission of this cell would satisfy $$-T(i)+\text{cell\_time} \leq A(i,m+k)-B(i,m+k) \leq (n/2+1)T(i)$$

This simply means that the RE scheduler treats any missed cell opportunity as if the cell was actually sent, so the m-th cell is indistinguishable from the m+k-th cell if k cell opportunities were missed.

Property 1, as described above, gives the worst case discrepancy bound that could be proved analytically. In actual simulations performed, the discrepancy observed for all cells of all flows satisfied a much tighter constraint which is formulated below as a conjecture.

A conjecture is that the discrepancy bound of the RE scheme is $$-T(i)+\text{cell\_time} \leq A(i,m)-B(i,m) \leq T(i)+\text{cell\_time}$$

where the notation is the same as in Property 1.

The second property, referred to as Property 2, exhibited by the RE scheduler described above is that the long-term rate achieved by flow f under RE scheduling is exactly the assigned rate R(f) of flow F, i.e., the RE Scheduler provides stringent rate guarantees to all its flows for an arbitrary set of rates assigned to the flows.

This second property immediately follows from the first property, described above, since each cell is transmitted within a fixed bound from its ideal transmission time.

The derivation of the RE scheme described above is found in Appendix A. The proof of the Property 1, described above, may be found in Appendix B.

Figure 2:
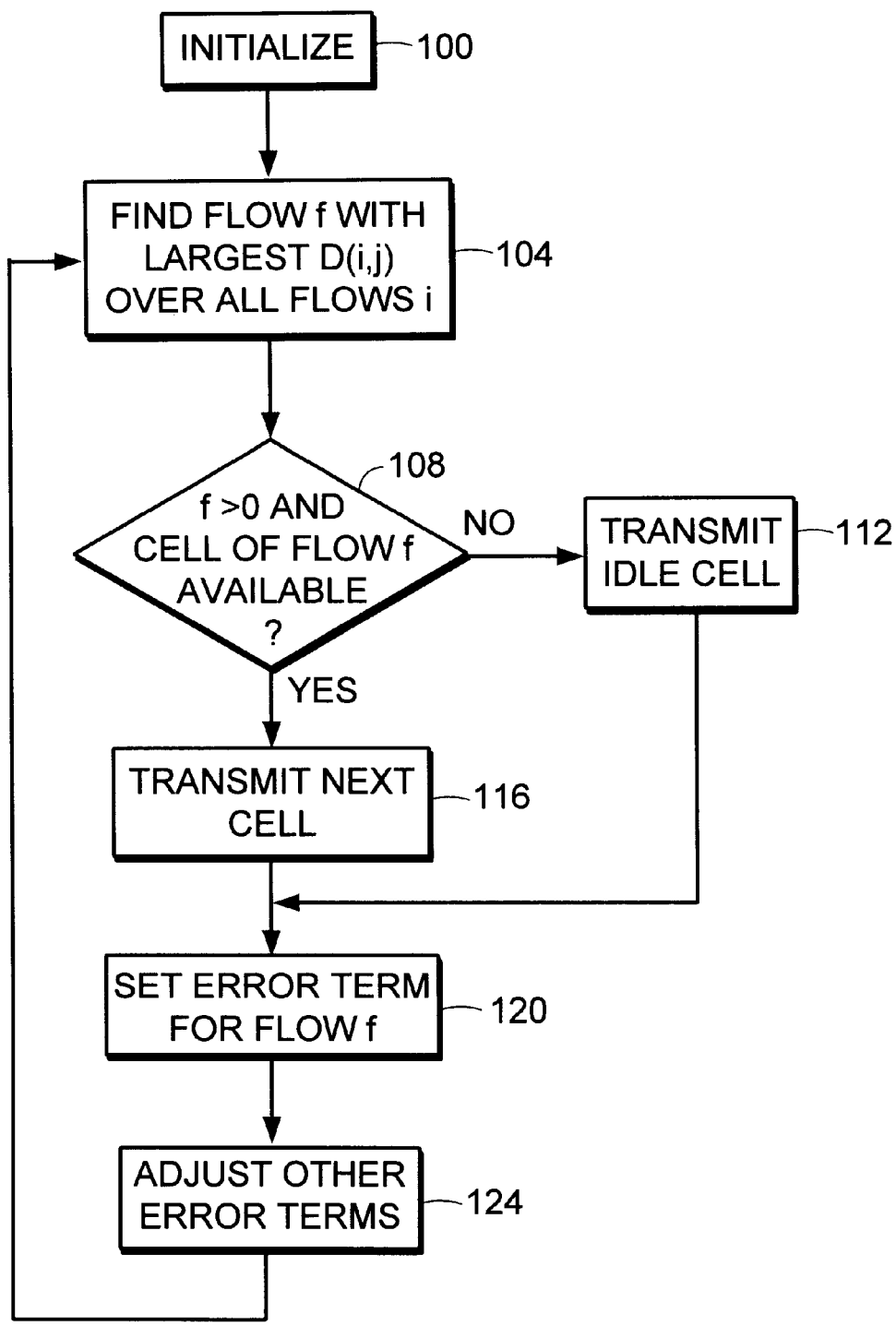
FIG. 2 is a flow chart illustrating the invention as it resides in the scheduler 50 of host node 10 of FIG. 1.

Referring now to FIG. 2, a flow chart of the operation of the RE scheme as it executes in any of the schedulers of FIG. 1 is shown. FIG. 2 depicts the operation of the scheme on static rates. The process begins at step 100 wherein the scheduler conducts an initialization. During the initialization, the following is executed by the scheduler. A link cell slot zero is set equal to 0. A virtual flow rate R(0) is set equal to the difference between the available bandwidth C and the sum of all rates of real flows i=1, 2, ... n. Finally, for all flow rates i=1, 2, ... n, a rate of flow for each flow rate i relative to the total bandwidth C is set equal to the quotient of the rate of flow i and the total available bandwidth C, and an error term for each flow i at link cell slot 0 is set equal to 0.

At step 104 the RE scheduler finds a flow f with an error term D(f,j) equal to the maximum for all the error terms D(i,j) in the set of all flows i.

At step 108, the scheduler checks whether a flow f is a virtual flow (f=0) or f is a "real" flow (f>0). If it is a virtual flow, or if f is a real flow but does not have a cell available, then at step 112 an idle cell is transmitted. If so, at step 116 the next cell from flow f is transmitted.

At step 120, the link cell slot index j is incremented by 1 and the error term for flow f at link cell slot j is set equal to the error term for flow f at link cell slot j plus the relative rate of flow f w(i) minus 1.

At step 124, for all rates of flow i not equal to the rate of flow f, the error term for flow i at link cell slot j is set equal to the error term for flow i at link cell slot j plus the rate of flow i relative to the total available bandwidth C. The scheduler then returns to step 104 to continue.

Figure 3:
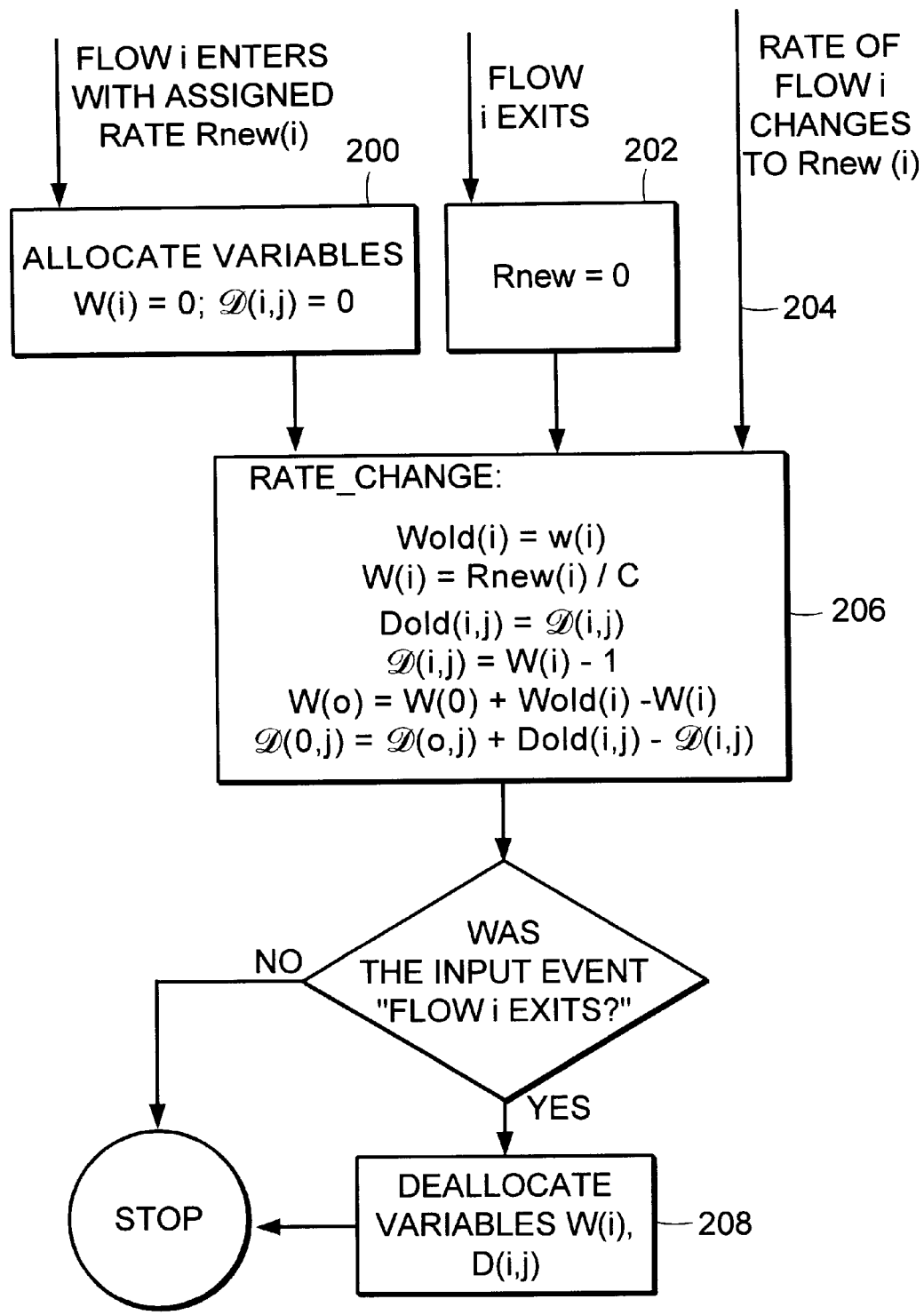
FIG. 3 is a flow diagram showing the effect of three external events upon the scheduler 50 of host node 10 of FIG. 1.

Referring now to FIG. 3, a block diagram shows an action taken when one of the following three external events, labeled as step 200, 202, and 204, respectively, occur:

(1) At step 200 a new flow i enters with an assigned rate Rnew(i). In this case variables w(i) and R(i,j) are allocated and initialized to zero and procedure Rate_Change is executed by the scheduler at step 206.

(2) At step 202 the scheduler detects (or is notified) that flow i exited. In this case Rnew(i) is set to zero, then the procedure Rate_Change is executed at step 206, after which the variables w(i) and D(i,j) are deallocated at step 208.

(3) At step 204, the rate of flow i changes to Rnew(i). In this case, the procedure Rate_Change is executed at step 206.

Note that these three events described in steps 200, 202, and 204 can occur completely synchronously with the execution of the RE_Scheduler at step 206. However, since the result of the execution of the procedure Rate_Change at step 206 affects the variables w(i), w(0), D(i,j) and D(0,j), which are used by the scheduler at step 206, it is assumed that these variables are updated at the beginning of some (preferably the closest) cell slot time after the event occurred, and that the update precedes the decision of the RE_Scheduler at step 206.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method of rate-based scheduling of a plurality of data flows in a shared resource in a computer system, each of the data flows containing data cells, comprising the steps of:

for each of the data flows in the plurality, providing, to a scheduler, an error term and a working frequency, the working frequency being an assigned rate of data flow relative to a total available bandwidth of the shared resource;

scheduling, by the scheduler, each of the data flows on a per cell basis such that for each data flow the error term is substantially equal to the provided error term and each of the data flows achieves a long term average data now rate that is substantially equal to respective data flow's assigned rate of data flow said scheduler using the provided working frequency to define the error term per cell of the respective data flow, instead of using rate of the data flow.

2. The method of rate-based scheduling of data flows in the shared resource in the computer system according to claim 1 wherein the step of providing comprises the steps of:

setting a value of a link cell slot to zero;

setting a value of a virtual flow rate equal to the difference between the value of the available bandwidth in the shared resource and a value of a sum of the assigned rates of all the data flows;

setting the assigned rate of data flow relative to the available bandwidth of the shared resource for each of the data flows to a quotient of the assigned rate of flow of each data flow and the total available bandwidth; and setting the error term for each data flow rate at link cell slot 0 to the value of zero.

3. The method of rate-based scheduling of data flows in the shared resource in the computer system according to claim 1 wherein the step of scheduling comprises the steps of:

selecting a data flow dependent on the data flow's error term;

determining whether the data flow and a cell of the data flow are available;

sending a null cell if the step of determining determines that said data flow and said cell of the data flow are unavailable;

transmitting said cell if the step of determining determines that said data flow and said cell of the data flow are available;

incrementing a link cell slot;

setting the error term for said data flow at said link cell slot equal to the error term for the data flow at the link cell slot plus the assigned rate of data flow relative to the available bandwidth minus 1; and for each of the data flows not equal to the data flow, the error term for each of the data flows at the link cell slot is set equal to each of the data flows' error term at the link cell slot plus each of the data flows' assigned rate of data flow relative to the available bandwidth.

4. A method of rate-based scheduling of data flows in a shared resource in a computer system, each of the data flows containing data cells, comprising the steps of:

providing an error term and an assigned rate of data flow relative to the available bandwidth of the shared resource for each of the data flows;

scheduling each of the data flows such that each of the data flows' error term is substantially equal to the provided error term on a per data cell basis and each of the data flow achieves a long term average data flow that is substantially equal to each of the data flows' assigned rate of data flow;

wherein said providing step comprises the steps of:
  setting a value of a link cell slot to zero;
  Setting a value of a virtual flow rate equal to the difference between the value of the available bandwidth in the shared resource and a value of a sum of the assigned rates of all the data flows;
  setting the assigned rate of data flow relative to the available bandwidth of the shared resource for each of the data flows to a quotient of the assigned rate of flow of each data flow and the total available bandwidth; and
  setting the error term for each data flow rate at link cell slot 0 to the value of zero.

5. A method of rate-based scheduling of data flows in a shared resource in a computer system, each of the data flows containing data cells, comprising the steps of:

providing an error term and an assigned rate of data flow relative to the available bandwidth of the shared resource for each of the data flows;

scheduling each of the data flows such that each of the data flows' error term is substantially equal to the provided error term on a per data cell basis and each of the data flow achieves a long term average data flow that is substantially equal to each of the data flows' assigned rate of data flow;

wherein said providing step comprises the steps of:
  selecting a data flow dependent on the data flow's error term;
  determining whether the data flow and a cell of the data flow are available;
  sending a null cell if the step of determining determines that said data flow and said cell of the data flow are unavailable;
  transmitting said cell if the step of determining determines that said data flow and said cell of the data flow are available;
  incrementing a link cell slot;
  setting the error term for said data flow at said link cell slot equal to the error term for the data flow at the link cell slot plus the assigned rate of data flow relative to the available bandwidth minus 1; and
  for each of the data flows not equal to the data flow, the error term for each of the data flows at the link cell slot is set equal to each of the data flows' error term at the link cell slot plus each of the data flows' assigned rate of data flow relative to the available bandwidth.

6. A method of rate-based scheduling of a plurality of data flows in a shared resource in a computer system, each of the data flows containing data cells, comprising the steps of:

for each of the data flows in the plurality, storing, in a scheduler, a respective error term equal to a relative error in transmission time between an actual scheduling time and an ideal scheduling time accumulated by the data flow at the beginning of a link cell slot and an assigned rate of flow relative to a total available bandwidth of the shared resource; and scheduling, by the scheduler, on a per cell basis each of the data flows as a function of the data flow's error term such that each of the data flows achieves a long term average flow rate that is substantially equal to that data flow's assigned rate of flow.

7. The method of rate-based scheduling of data flows in the shared resource in the computer system according to claim 6 wherein the step of providing comprises the steps of:

setting a value of the link cell slot to zero;

setting a value of a virtual flow rate equal to a difference between a value of available bandwidth in the shared resource and a value of a sum of the assigned rates of flow of all of the data flows;

setting the assigned rate of flow relative to the total available bandwidth of the shared resource for each of the data flows to a quotient of the assigned rate of flow of each data flow and the total available bandwidth; and setting the error term for each data flow at link cell slot zero to the value of zero.

8. The method of rate-based scheduling of data flows in the shared resource in the computer system according to claim 6 wherein the step of scheduling comprises the steps of:

selecting a data flow dependent on the data flow's error term;

determining whether the data flow and a cell of the data flow are available;

sending a null cell if the step of determining determines that said data flow and said cell of the data flow are unavailable;

transmitting said cell if the step of determining determines that said data flow and said cell of the data flow are available;

incrementing said link cell slot;

setting the error term for said data flow at said link cell slot equal to the error term for the data flow at the link cell slot plus the assigned rate of data flow relative to the available bandwidth minus 1; and for each of the data flows not equal to the data flow, the error term for each of the data flows at the link cell slot is set equal to each of the data flows' error term at the link cell slot plus each of the data flows' assigned rate of data flow relative to the available bandwidth.

* * * * *

UNITED STATES PATENT AND TRADEMARK OFFICE
CERTIFICATE OF CORRECTION

PATENT NO.   : 6,130,878
DATED        : October 10, 2000
INVENTOR(S)  : Anna Charny It is certified that error appears in the above-identified patent and that said Letters Patent is hereby corrected as shown below:

Column 8, Claim 1, line 40, change "now" to "flow".
Column 8, Claim 1, line 41, change "flow said" to "flow, said".
Column 9, Claim 4, line 28, change "flow" (first occurrence) to "flows".
Column 9, Claim 4, line 33, change "Setting" to "setting".
Column 10, Claim 5, line 2, change "said" (first occurrence) to "each".

Signed and Sealed this

Twenty-second Day of May, 2001

Attest:

NICHOLAS P. GODICI

Attesting Officer      Acting Director of the United States Patent and Trademark Office